(12) United States Patent
Lai et al.

(10) Patent No.: US 10,473,338 B2
(45) Date of Patent: Nov. 12, 2019

(54) SUPERIMPOSED CONVEYANCE OF DATA AND ELECTRICAL POWER

(71) Applicant: Google Inc., Mountain View, CA (US)

(72) Inventors: Hui-Fang Lai, Taoyuan (TW); Alexander Schoenen, Portland, OR (US); Victor Liu, Mountain View, CA (US); HungYang Lee, Taipei (TW); Michael John Mitchell, San Francisco, CA (US); Taw Lim, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/065,295

(22) Filed: Mar. 9, 2016

(65) Prior Publication Data

US 2017/0261214 A1  Sep. 14, 2017

(51) Int. Cl.
*F24D 19/10* (2006.01)
*H02J 4/00* (2006.01)

(52) U.S. Cl.
CPC ............... *F24D 19/10* (2013.01); *H02J 4/00* (2013.01)

(58) Field of Classification Search
CPC .................................................. F24D 2220/04
See application file for complete search history.

(56) References Cited

U.S. PATENT DOCUMENTS

| | | | |
|---|---|---|---|
| 2,422,519 A | 6/1947 | Barker | |
| 5,248,083 A * | 9/1993 | Adams | G05D 23/1913 236/11 |
| 5,281,956 A * | 1/1994 | Bashark | D06F 37/304 340/12.32 |
| 5,920,168 A * | 7/1999 | Lewis | F23N 1/002 110/101 C |
| 5,997,278 A * | 12/1999 | Sutton | F23N 1/022 236/15 BD |

(Continued)

FOREIGN PATENT DOCUMENTS

| | | |
|---|---|---|
| DE | 2521388 A1 | 11/1976 |
| DE | 19813955 A1 | 9/1999 |

OTHER PUBLICATIONS

"OpenTherm—Wikipedia, the free encyclopedia", http://en.wikipedia.org/wiki/OpenTherm, Jan. 3, 2016, p. 4.

(Continued)

*Primary Examiner* — Adam D Houston
(74) *Attorney, Agent, or Firm* — Morris & Kamlay LLP

(57) ABSTRACT

In a method for superimposed conveyance of data and electrical power, a first switch can cycle to convey the electric power and data from a first device. Binary digits of the data from the first device can be represented by transitions, of a voltage at a node of a second device, between a first voltage and a second voltage. A second switch can cycle to convey data from the second device. Binary digits of the data from the second device can be represented by transitions, of a current through a component of the first device, between being less than a threshold and being greater than the threshold. A voltage regulator of the second device can provide, in response to the voltage at the node being within a range of voltages that includes the first voltage and the second voltage, the electrical power to one or more components.

30 Claims, 12 Drawing Sheets

(56) References Cited

U.S. PATENT DOCUMENTS

| | | | | |
|---|---|---|---|---|
| 6,062,483 | A * | 5/2000 | Meletio | G05D 23/1906 236/78 R |
| 6,066,843 | A * | 5/2000 | Scheremeta | G05D 23/1902 250/214 AL |
| 6,388,449 | B1 * | 5/2002 | Ramsden | H03M 1/1009 324/426 |
| 6,538,552 | B2 * | 3/2003 | Bianchi | G05D 23/1912 337/1 |
| 6,662,866 | B1 * | 12/2003 | Heath | F23N 5/203 165/267 |
| 6,779,736 | B1 * | 8/2004 | Lorenz | G05D 23/1917 236/91 G |
| 6,837,441 | B1 * | 1/2005 | Lorenz | G05D 23/1917 236/46 F |
| 6,956,463 | B2 | 10/2005 | Crenella | |
| 7,012,518 | B2 | 3/2006 | Novikov et al. | |
| 7,748,640 | B2 | 7/2010 | Roher | |
| 7,775,452 | B2 | 8/2010 | Shah | |
| 7,966,438 | B2 | 6/2011 | Punyko et al. | |
| 8,350,522 | B2 * | 1/2013 | Johnson | G06F 1/266 320/107 |
| 8,612,657 | B2 | 12/2013 | Lance et al. | |
| 8,781,637 | B2 * | 7/2014 | Eaves | H02J 3/12 361/42 |
| 8,796,879 | B2 | 8/2014 | Korol et al. | |
| 8,804,482 | B2 | 8/2014 | Rhemlimi et al. | |
| 2002/0179299 | A1 * | 12/2002 | Opris | G05D 23/1909 165/254 |
| 2003/0050737 | A1 * | 3/2003 | Osann, Jr. | G05B 15/02 700/276 |
| 2003/0213853 | A1 * | 11/2003 | Demster | E04B 9/02 236/49.3 |
| 2004/0177817 | A1 * | 9/2004 | Bradenbaugh | F24H 9/2021 122/13.01 |
| 2004/0263321 | A1 | 12/2004 | Hair, III et al. | |
| 2005/0240312 | A1 * | 10/2005 | Terry | F25B 49/005 700/276 |
| 2007/0228835 | A1 * | 10/2007 | Varzhabedian | H02J 7/027 307/66 |
| 2008/0188994 | A1 * | 8/2008 | Singh | F04D 27/004 700/300 |
| 2009/0284022 | A1 * | 11/2009 | Usselman | F02D 29/06 290/38 R |
| 2010/0163634 | A1 * | 7/2010 | Klein | F24D 19/1048 236/94 |
| 2011/0260742 | A1 * | 10/2011 | Sims | H02J 7/042 324/713 |
| 2014/0316586 | A1 * | 10/2014 | Boesveld | H04Q 9/00 700/278 |
| 2015/0276238 | A1 * | 10/2015 | Matsuoka | G05B 15/02 700/278 |
| 2016/0241039 | A1 * | 8/2016 | Cheng | H02J 3/383 |
| 2017/0261214 | A1 * | 9/2017 | Lai | F24D 19/10 |
| 2018/0136675 | A1 * | 5/2018 | Marschalkowski | G05D 23/19 |

OTHER PUBLICATIONS

Extended European Search Report dated Aug. 8, 2017 as received in Application No. 16165067.6.

* cited by examiner

900

902
Cycle a first switch to convey electrical power and data
from a first device to a second device
in which binary digits of the data from the first device
are represented by transitions,
of a voltage at a node of the second device,
between a first voltage and a second voltage 904
Cycle a second switch to convey data
from the second device to the first device
in which binary digits of the data from the second device
are represented by transitions,
of a current through a component of the first device,
between being less than a threshold current
and being greater than the threshold current 906
Provide, by a voltage regulator of the second device
and in response to the voltage at the node
being within a range of voltages
that includes the first voltage and the second voltage,
the electrical power,
at a voltage greater than or equal to a threshold voltage,
to one or more components

FIG. 9

SUPERIMPOSED CONVEYANCE OF DATA AND ELECTRICAL POWER

BACKGROUND

A contemporary building is commonly heated by a central heating system. A central heating system is characterized by generation of heat in one room of the building and distribution of the generated heat to other rooms of the building. The heat is typically distributed by air forced through ductwork, by water running through pipes, or by steam flowing through pipes. The heat is generated by a heat generator. The heat generator can be a furnace, a burner, a heater, a boiler, or the like. Fuel for the heat generator can be natural gas, heating oil, kerosene, coal, peat, wood, biofuel, or the like. In some cases, the heat generator can use more than one type of fuel.

A thermostat is used to sense a temperature within the building and to use the sensed temperature as feedback to control the heat generator. For example, if the sensed temperature is greater than a setpoint temperature of the thermostat, then the thermostat changes an operating state of the heat generator from on to off. Conversely, if the sensed temperature is less than the setpoint temperature of the thermostat, then the thermostat changes the operating state of the heat generator from off to on. However, limiting control of the heat generator merely to changing the operating state often results in an underdamped control system in which gradients of thermal energy are produced within the building. For example, before the operating state of the heat generator changes from on to off, temperatures at some locations can be greater than the temperature sensed by the thermostat. Similarly, before the operating state of the heat generator changes from off to on, temperatures at some locations can be less than the temperature sensed by the thermostat. Such an underdamped control system can result in a level of comfort of people within the building that is less than what might otherwise be realized and can waste fuel.

Particularly in countries located in temperate climate zones, fuel consumed by central heating systems is a significant portion of all fuel consumed. For at least this reason, the European Commission issued Regulation No. 813/2013 on Aug. 2, 2013. This regulation states that certain heat generators, placed in the market and/or put into service after Sep. 26, 2015, must meet specific requirements with respect to efficiency. Manufacturers of heat generators have pursued various strategies to increase efficiency. Among these strategies have been efforts to better use the sensed temperature as feedback to control the heat generator. Rather than merely changing the operating state of the heat generator, the sensed temperature can be used to modulate operations of various components of the heat generator. For example, a position of a fuel valve of the heat generator and/or a speed of a blower of the heat generator can be incrementally controlled. In this manner, the overall control of the heat generator can approach that of a critically damped control system and thermal energy can be more uniformly distributed within the building. In comparison with a conventional control system, a control system that modulates operations of various components of the heat generator can improve the level of comfort of people within the building and can result in more efficient consumption of fuel.

An ability to communicate data between the thermostat and the heat generator can improve efforts to modulate operations of various components of the heat generator. To facilitate standardization of such communication, the OpenTherm® Association of Zoetermeer, Netherlands, has been established to manage the development and the licensing of versions of the OpenTherm® communication protocol and interface specification.

BRIEF SUMMARY

According to an implementation of the disclosed subject matter, a system for superimposed conveyance of data and electrical power can include a switch, a controller, a voltage regulator, current measurement circuitry, and a comparator. The switch can be connected between a first port and a second port. The first port can be configured to be connected to a supply of the electrical power. The supply can be at a first voltage level. The controller can be configured to control operation of the switch. The voltage regulator can be connected between the first port and the second port. The voltage regulator can be configured to receive the electrical power regardless of a position of the switch. The voltage regulator can be configured to produce a second voltage level. The current measurement circuitry can be connected between the first port and the switch. The comparator can be connected to the current measurement circuitry.

According to an implementation of the disclosed subject matter, a system for superimposed conveyance of data and electrical power can include a resistor, a switch, a controller, a comparator, and a voltage regulator. The resistor can be connected between a ground and a node. The node can be between a first port and a second port. The first port can be configured to be connected to a supply of the electrical power. The second port can be configured to be connected to a load. The switch can be connected in series with the resistor. The controller can be configured to control operation of the switch. The comparator can be connected to the node. The voltage regulator can be connected between the node and the second port.

According to an implementation the disclosed subject matter, a method for superimposed conveyance of data and electrical power can include causing a first switch to change from a conductive state to a nonconductive state, to change from the nonconductive state to the conductive state, or both to convey the electrical power and data from a first device to a second device. The data from the first device can be represented by binary digits. A first binary digit of the data from the first device can be represented by a transition, of a voltage level at a node of the second device and at a specific point in a first cycle, from a first voltage level to a second voltage level. A second binary digit of the data from the first device can be represented by a transition, of the voltage level at the node of the second device and at the specific point in the first cycle, from the second voltage level to the first voltage level. The method can include causing a second switch to change from the conductive state to the nonconductive state, to change from the nonconductive state to the conductive state, or both to convey data from the second device to the first device. The data from the second device can be represented by the binary digits. A first binary digit of the data from the second device can be represented by a transition, of a current level through a component of the first device and at the specific point in a second cycle, from being less than a threshold current level to being greater than the threshold current level. A second binary digit of the data from the second device can be represented by a transition, of the current level through the component of the first device and at the specific point in the second cycle, from being greater than a threshold current level to being less than the threshold current level. The method can include providing, by a voltage regulator of the second device and in response to the voltage level at the node being within a range of voltages that includes the first voltage level and the second voltage level, the electrical power to one or more components. The electrical power can be provided at a voltage level greater than or equal to a threshold voltage level.

According to an implementation of the disclosed subject matter, a system for superimposed conveyance of data and electrical power can include means for causing conveyance of the electrical power and data from a first device to a second device. The data from the first device can be represented by binary digits. A first binary digit of the data from the first device can be represented by a transition, of a voltage level at a node of the second device and at a specific point in a first cycle, from a first voltage level to a second voltage level. A second binary digit of the data from the first device can be represented by a transition, of the voltage level at the node of the second device and at the specific point in the first cycle, from the second voltage level to the first voltage level. The system can include means for causing conveyance of data from the second device to the first device. The data from the second device can be represented by the binary digits. A first binary digit of the data from the second device can be represented by a transition, of a current level through a component of the first device and at the specific point in a second cycle, from being less than a threshold current level to being greater than the threshold current level. A second binary digit of the data from the second device can be represented by a transition, of the current level through the component of the first device and at the specific point in the second cycle, from being greater than a threshold current level to being less than the threshold current level. The system can include means for providing, in response to the voltage level at the node being within a range of voltages that includes the first voltage level and the second voltage level, the electrical power to one or more components. The electrical power can be provided at a voltage level greater than or equal to a threshold voltage level.

Additional features, advantages, and embodiments of the disclosed subject matter are set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 9 is a flow diagram of an example of a method for superimposed conveyance of data and electrical power according to the disclosed subject matter.

DETAILED DESCRIPTION

Manufacturers of heat generators have pursued various strategies to increase efficiency. Among these strategies have been efforts to better use a temperature, sensed by a thermostat, as feedback to control a heat generator. Rather than merely changing an operating state of the heat generator, the sensed temperature can be used to modulate operations of various components of the heat generator. For example, a position of a fuel valve of the heat generator and/or a speed of a blower of the heat generator can be incrementally controlled. An ability to communicate data between the thermostat and the heat generator can improve efforts to modulate operations of various components of the heat generator.

Aspects disclosed herein describe systems and a method for superimposed conveyance of data and electrical power. A first switch can cycle to convey the electric power and data from a first device to a second device. Binary digits of the data from the first device can be represented by transitions, of a voltage level at a node of the second device, between a first voltage level and a second voltage level. A second switch can cycle to convey data from the second device to the first device. Binary digits of the data from the second device can be represented by transitions, of a current level through a component of the first device, between being less than a threshold current level and being greater than the threshold current level. A voltage regulator of the second device can provide, in response to the voltage level at the node being within a range of voltages that includes the first voltage level and the second voltage level, the electrical power to one or more components of the second device. The electrical power can be provided at a voltage level greater than or equal to a threshold voltage level.

Figure 1:
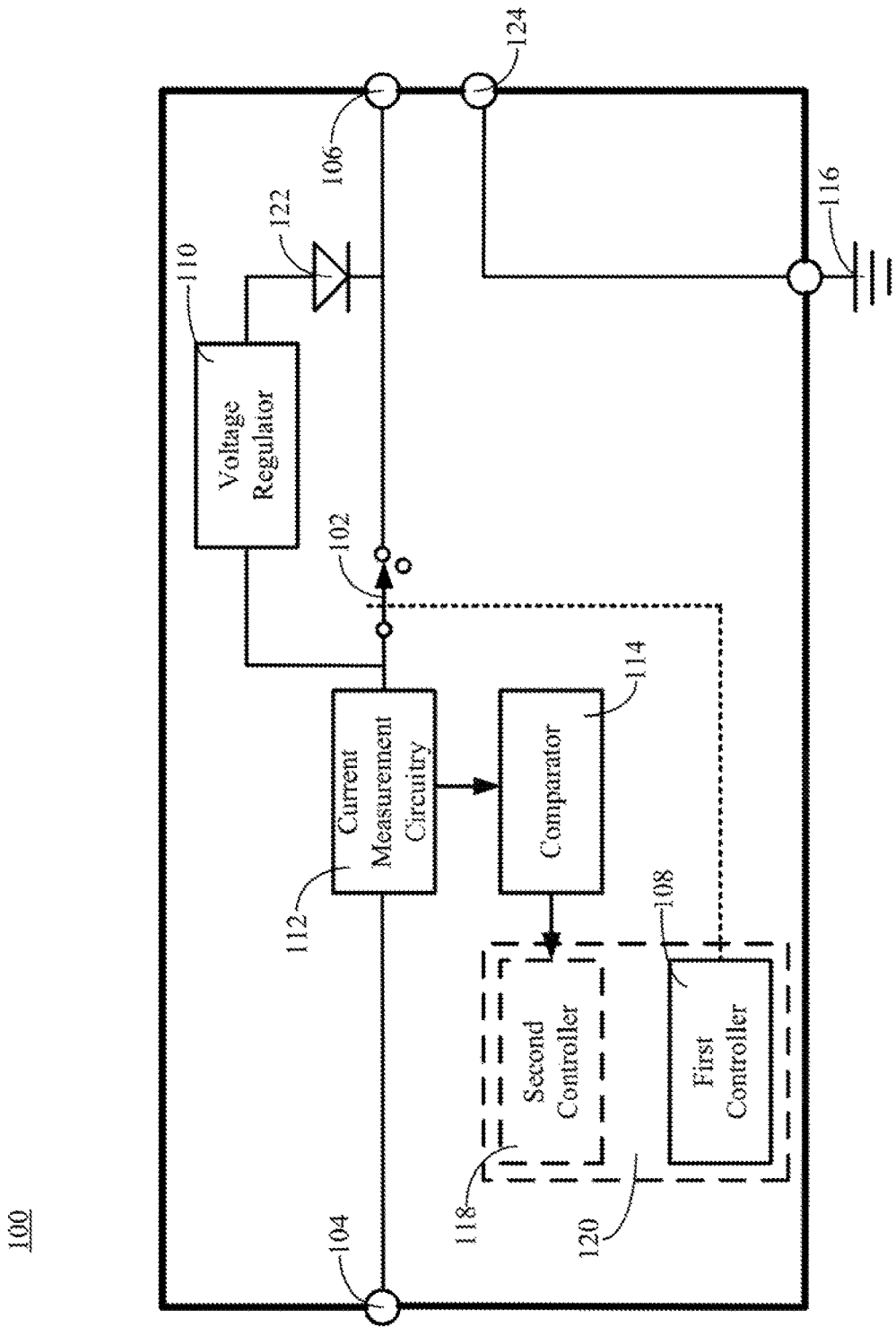
FIG. 1 is a block diagram of an example of a system for superimposed conveyance of data and electrical power according to the disclosed subject matter.

FIG. 1 is a block diagram of an example of a system 100 for superimposed conveyance of data and electrical power according to the disclosed subject matter. The system 100 can include a switch 102, a first controller 108, a voltage regulator 110, current measurement circuitry 112, and a comparator 114. The switch 102 can be connected between a first port 104 and a second port 106. The first port 104 can be configured to be connected to a supply (not illustrated) of the electrical power. The supply can be at a first voltage level of the system 100. In a realization, the first voltage level of the system 100 can be 12 volts. The first controller 108 can be configured to control operation of the switch 102. The voltage regulator 110 can be connected between the first port 104 and the second port 106. The voltage regulator 110 can be configured to receive the electrical power regardless of a position of the switch 102. The voltage regulator 110 can be configured to produce a second voltage level of the system 100. In a realization, the second voltage level of the system 100 can be 5 volts. The current measurement circuitry 112 can be connected between the first port 104 and the switch 102. The comparator 114 can be connected to the current measurement circuitry 112. For example, the system 100 can be configured to be disposed in a room 1002 in which a heat generator 1004 is installed. (See FIG. 10.) The system 100 can be configured to sense and control a position of a fuel valve of the heat generator 1004. The system 100 can be configured to sense and control a speed of a blower of the heat generator 1004. The heat generator 1004 can be a furnace, a burner, a heater, a boiler, or the like.

Figure 2:
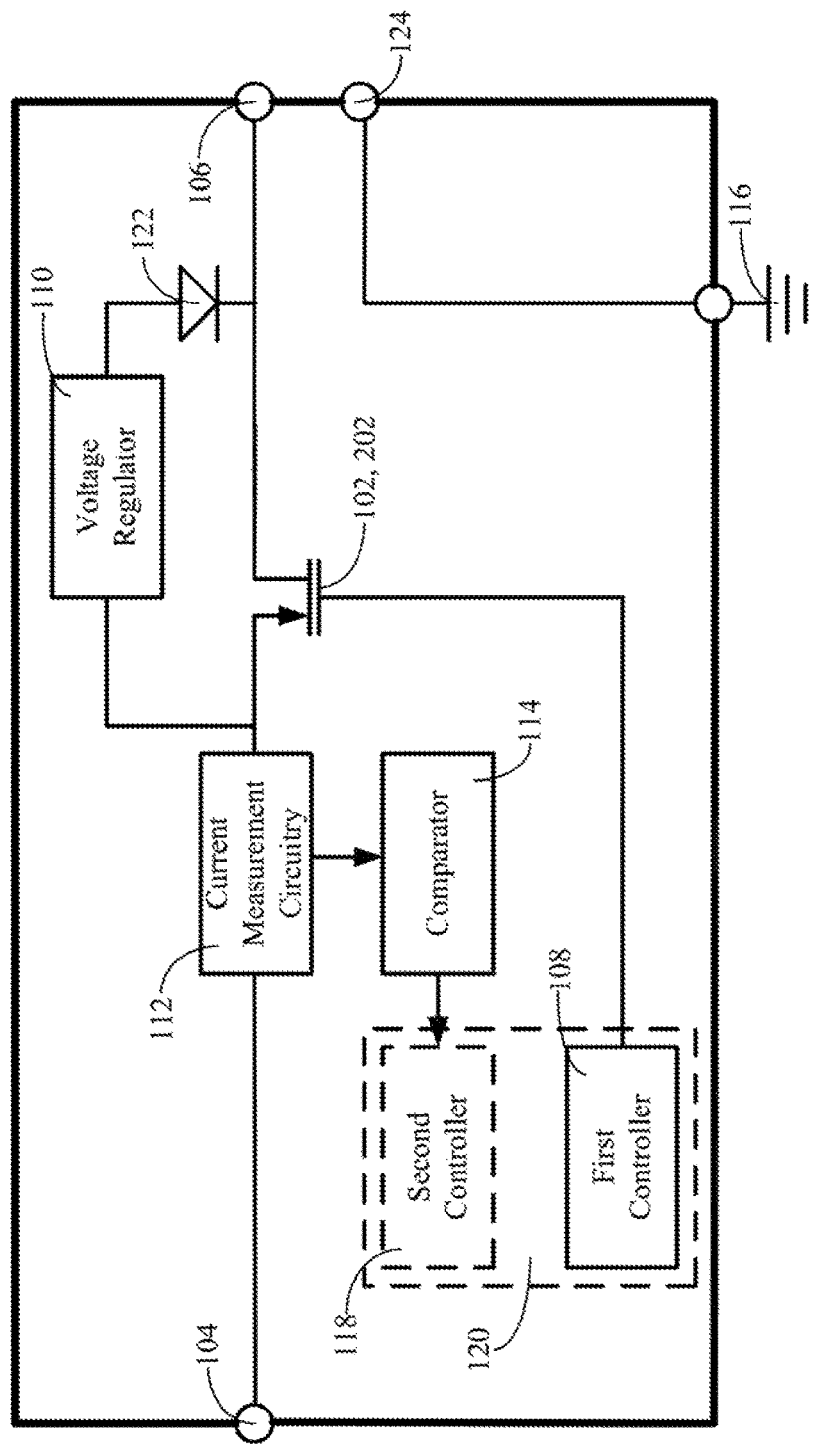
FIG. 2 is a block diagram of an example implementation of the system illustrated in FIG. 1 in which the switch can include a first transistor.

The switch 102 can include, for example, a relay, a microelectromechanical (MEMS) switch, a transistor, the like, or any combination thereof. If the switch 102 includes a transistor, then the transistor can be, for example, a bipolar junction transistor (BJT), a junction gate field-effect transistor (JFET), a metal-oxide-semiconductor field-effect transistor (MOSFET), the like, or any combination thereof. In an implementation, the switch 102 can be a p-channel MOSFET (PMOSFET) 202 as illustrated in FIG. 2. A source terminal of the PMOSFET 202 can be connected to the first port 104. A drain terminal of the PMOSFET 202 can be connected to the second port 106. A gate terminal of the PMOSFET 202 can be connected to the first controller 108.

Figure 3:
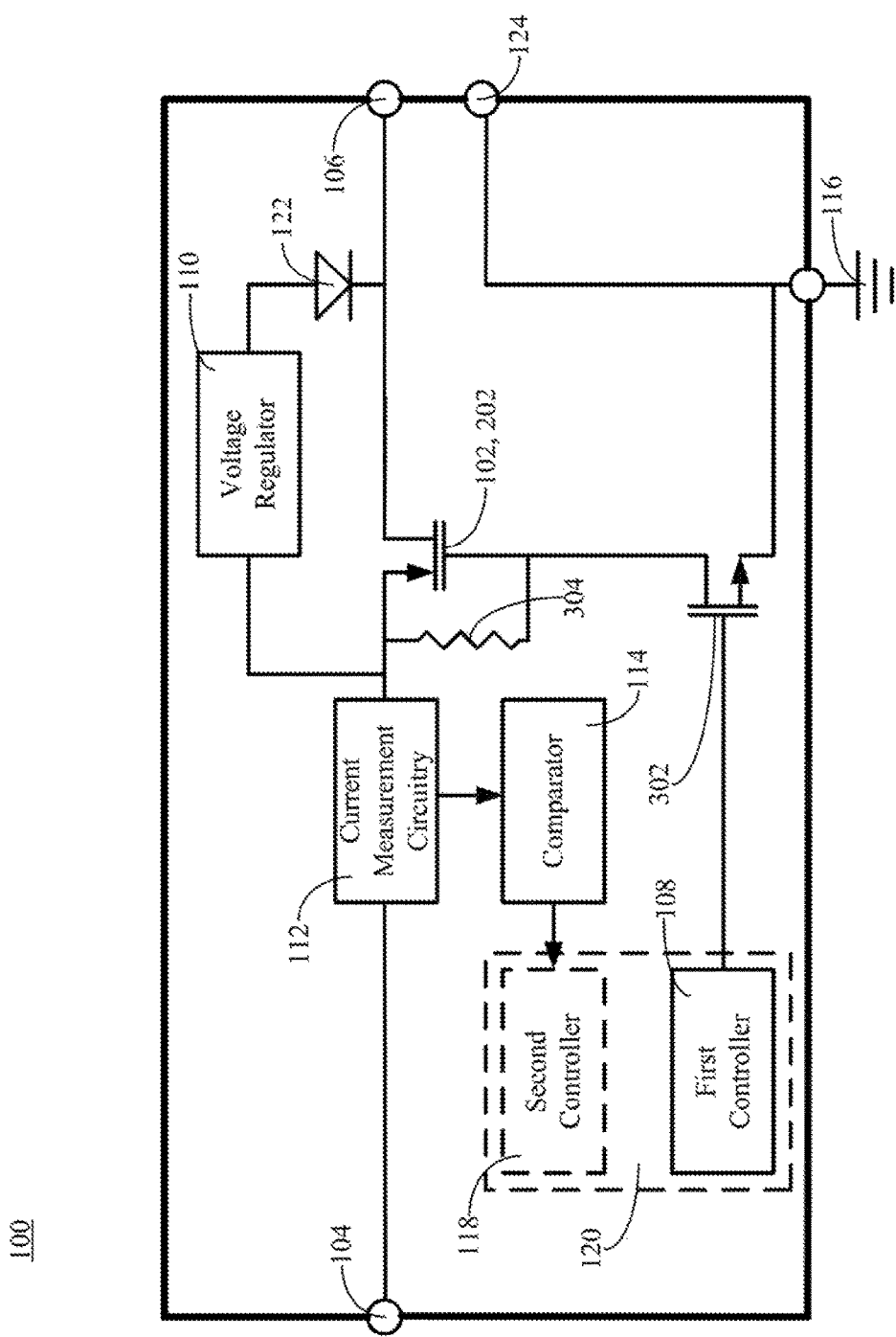
FIG. 3 is a block diagram of an example implementation of the system illustrated in FIG. 2 in which the first transistor can be controlled by a second transistor.

Optionally, in an implementation, the system 100 can further include an n-channel MOSFET (NMOSFET) 302 and a resistor 304 as illustrated in FIG. 3. In this implementation, the PMOSFET 202 can be controlled by the NMOSFET 302. Rather than being connected to the first controller 108, as illustrated in FIG. 2, the gate terminal of the PMOSFET 202 can be connected to a drain terminal of the NMOSFET 302. A source terminal of the NMOSFET 302 can be connected to a ground 116. A gate terminal of the NMOSFET 302 can be connected to the first controller 108. The resistor 304 can be connected between the source terminal of the PMOSFET 202 and the gate terminal of the PMOSFET 202.

The first controller 108 can be configured to transmit data as binary digits. For example, a first binary digit can be represented by the first voltage level of the system 100 and a second binary digit can be represented by the second voltage level of the system 100. Alternatively, for example, the first binary digit can be represented by a transition, at a specific point in a cycle, from the first voltage level of the system 100 to the second voltage level of the system 100, and the second binary digit can be represented by a transition, at the specific point in the cycle, from the second voltage level of the system 100 to the first voltage level of the system 100. In this example, the binary digits can be represented using Manchester coding. In this example, the cycle can be a cycle of a clock (not illustrated) for the first controller 108.

The voltage regulator 110 can be a low-dropout regulator. In an implementation, the voltage regulator 110 can include regulating charge pump circuitry. In a realization, the voltage regulator 110 can be Part No. R1191H050B provided by Ricoh Corporation, Ltd. of Tokyo, Japan.

Figure 4:
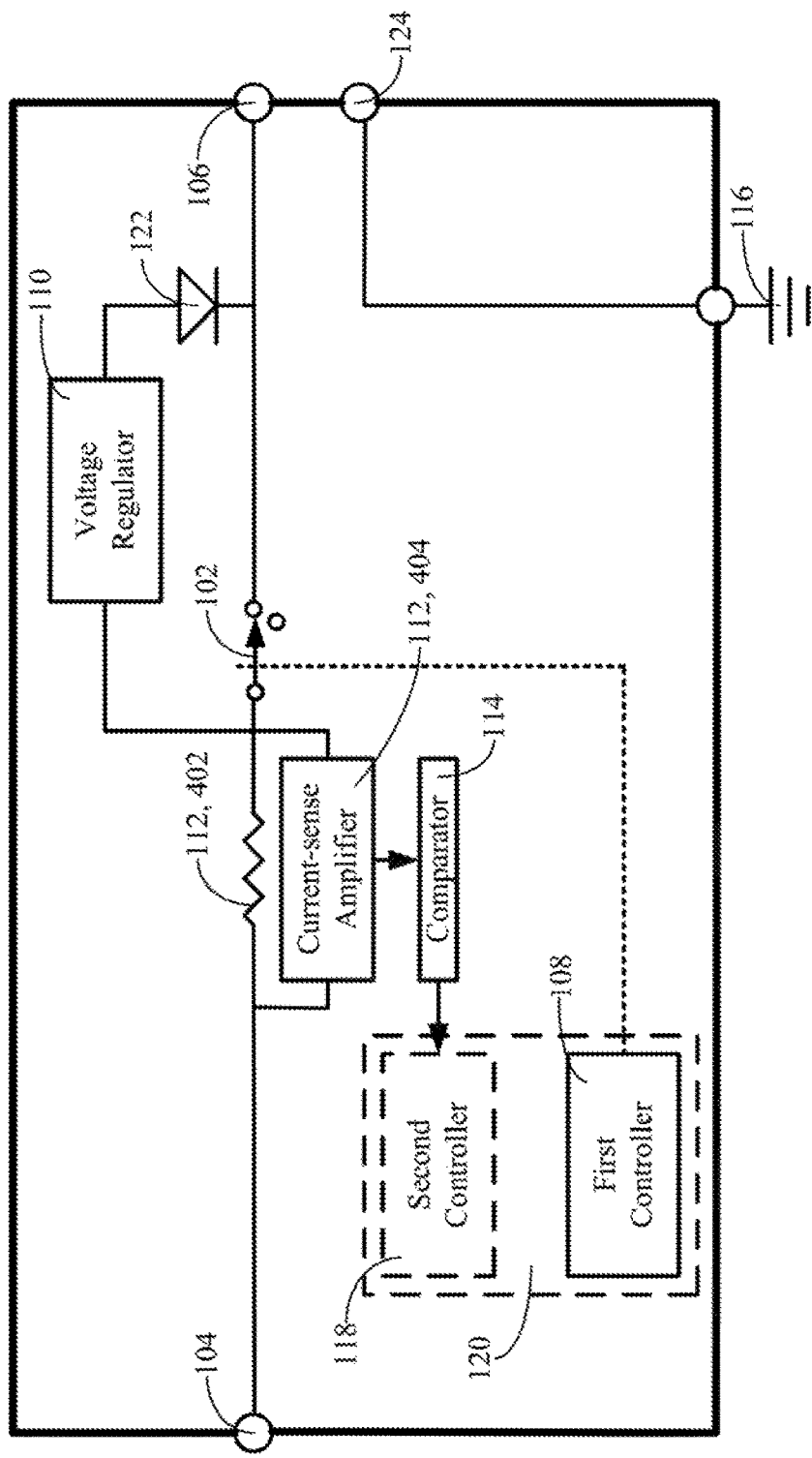
FIG. 4 is a block diagram of an example implementation of the system illustrated in FIG. 1 in which the current measurement circuitry can include a resistor and a current-sense amplifier.

FIG. 4 is a block diagram of an example implementation of the system 100 in which the current measurement circuitry 112 can include a resistor 402 and a current-sense amplifier 404. The resistor 402 can be connected between the first port 104 and the switch 102. In a realization, the resistor 402 can have a resistance of 0.1 ohm. The current-sense amplifier 404 can be connected between the first port 104 and the switch 102. In a realization, the current-sense amplifier 404 can be Part No. INA199B1 provided by Texas Instruments Inc. of Dallas, Tex. The current-sense amplifier 404 can be configured to measure a voltage across the resistor 402 and to produce, from this voltage, a first signal that indicates a current level through the resistor 402.

The comparator 114 can be configured to receive the first signal produced by the current measurement circuitry 112. The comparator 114 can be configured to produce, from the first signal, a second signal. The comparator 114 can be configured to compare the first signal to a threshold level to produce the second signal. For example, the second signal can be at a third voltage level produced by the comparator 114 in response to a current level measured by the current measurement circuitry 112 being greater than a threshold current level of the system 100. The second signal can be at a fourth voltage level produced by the comparator 114 in response to the current level measured by the current measurement circuitry 112 being less than the threshold current level of the system 100. In a realization, the comparator 114 can be Part No. ADCMP361 provided by Analog Devices, Inc. of Norwood, Mass. In a realization, the threshold current level of the system 100 can be 150 milliamps.

The system 100 can be configured to receive data as binary digits. For example, a first binary digit can be represented by the third voltage level and a second binary digit can be represented by the fourth voltage level. Alternatively, for example, the first binary digit can be represented by a transition, at a specific point in a cycle, from the third voltage level to the fourth voltage level, and the second binary digit being represented by a transition, at the specific point in the cycle, from the fourth voltage level to the third voltage level. In this example, the binary digits can be represented using Manchester coding. In this example, the cycle can be a cycle of a clock (not illustrated) for a controller of a device that transmitted the data. For example, the controller of the device that transmitted the data can be a first controller 514 of a system 500. (See FIG. 5.)

Optionally, the system 100 can further include a second controller 118. The second controller 118 can be configured to receive the second signal produced by the comparator 114. Alternatively, one or more functions of the first controller 108 and one or more functions of the second controller 118 can be realized in a combined controller 120.

The system 100 can be configured to convey only the electrical power by having the switch 102 in a conductive state so that the electrical power, at the first voltage level of the system 100, can be conveyed from the first port 104 to the second port 106.

The system 100 can be configured to convey the electrical power and to transmit data as binary digits by having the first controller 108 cause the switch 102 to be in the conductive state or a nonconductive state to cause the first voltage level of the system 100, produced by the supply of the electrical power, or the second voltage level of the system 100, produced by the voltage regulator 110, to be conveyed to the second port 106. The system 100 can include a diode 122 to prevent an output of the voltage regulator 110 from being subjected to the first voltage level of the system 100 when the switch 102 is in the conductive state. For example, the diode 122 can be a Schottky diode.

The system 100 can be configured receive data as binary digits from another device by measuring the current level through the current measurement circuitry 112, producing, at the current measurement circuitry 112, the first signal that indicates the current level, and producing, at the comparator 114, the second signal at the third voltage level, in response to the current level being greater than the threshold current level of the system 100, or at the fourth voltage level, in response to the current level being less than the threshold current level of the system 100. The supply of the electrical power can be configured to produce the electrical power at the first voltage level of the system 100 even when the current level through the current measurement circuitry 112 is greater than the threshold current level of the system 100. Likewise, the voltage regulator 110 can be configured to produce the second voltage level of the system 100 even when the current level through the current measurement circuitry 112 is greater than the threshold current level of the system 100. In this manner, the system 100 can be configured to convey the electrical power even when the system 100 is receiving the data from the other device. For example, the other device can be the system 500. (See FIG. 5.)

Figure 5:
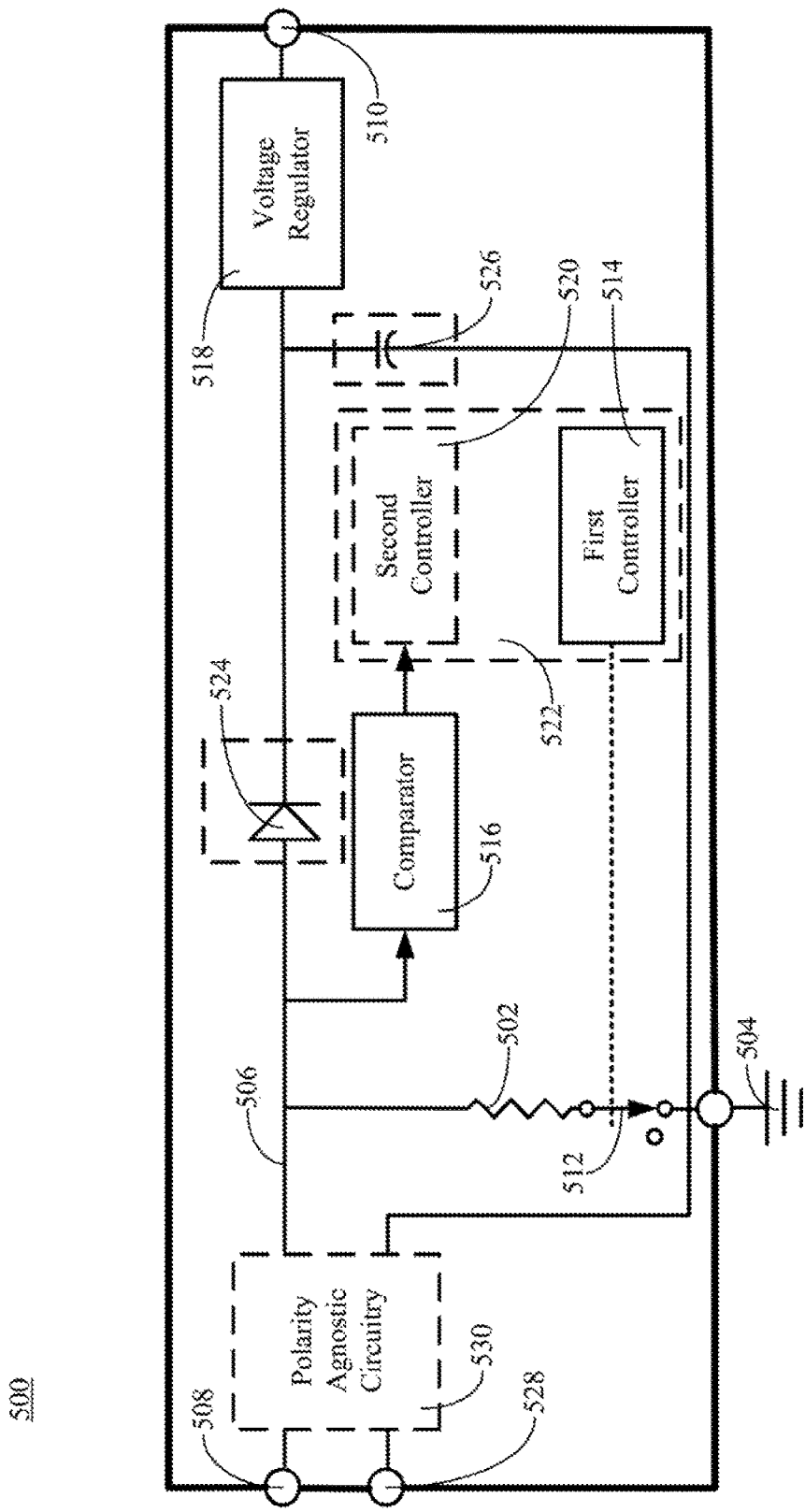
FIG. 5 is a block diagram of an example of a system for superimposed conveyance of data and electrical power according to the disclosed subject matter.

FIG. 5 is a block diagram of an example of the system 500 for superimposed conveyance of data and electrical power according to the disclosed subject matter. The system 500 can include a resistor 502, a switch 512, a first controller 514, a comparator 516, and a voltage regulator 518. The resistor 502 can be connected between a first ground 504 and a node 506. The node 506 can be between a first port 508 and a second port 510. The first port 508 can be configured to be connected to a supply (not illustrated) of the electrical power. The second port 510 can be configured to be connected to a load. The switch 512 can be connected in series with the resistor 502. The first controller 514 can be configured to control operation of the switch 512. The comparator 516 can be connected to the node 506. The voltage regulator 518 can be connected between the node 506 and the second port 510. For example, the resistor 502, the switch 512, and the comparator 516 can be disposed on a backplate 1006 of a thermostat 1008. (See FIG. 10.) For example, the first controller 514 can be disposed on a head unit 1010 of the thermostat 1008. (See FIG. 10.) The system 500 can be configured to receive a temperature sensed by the thermostat 1008 and to sense and control a temperature setting of the thermostat 1008. In a realization, the load can be about one watt.

In a realization, the resistor 502 can have a resistance of 82 ohms. Alternatively, for example, the resistor 502 can be replaced by a current source (not illustrated). In an implementation of this example, the current source can be a junction gate field-effect transistor (JFET) in which a source terminal of the JFET is connected to a gate terminal of the JFET. Alternatively, for example, the system 500 can include both the current source and the resistor 502. In this example, both the current source and the resistor 502 can be connected between the first ground 504 and the node 506.

Figure 6:
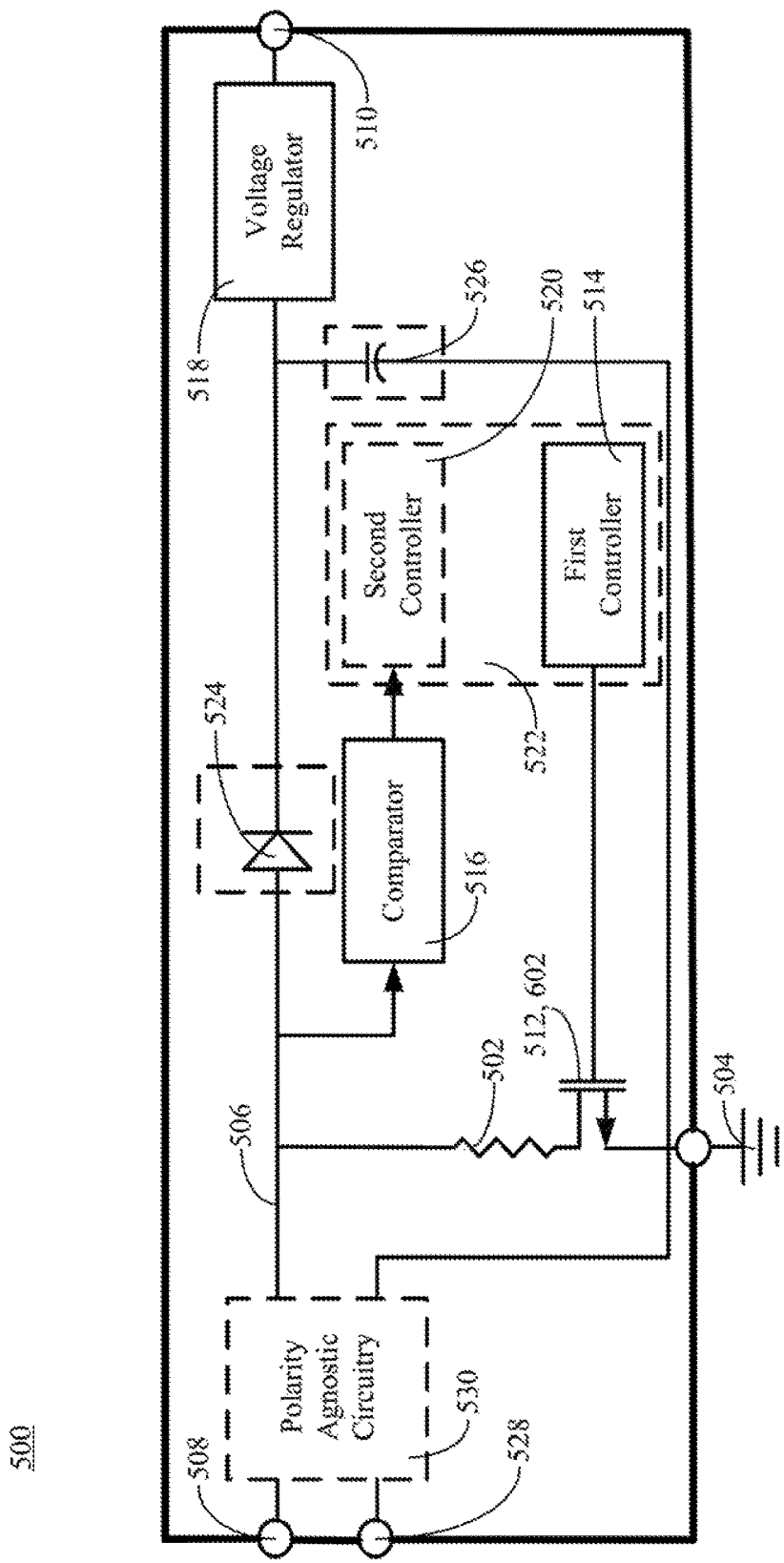
FIG. 6 is a block diagram of an example implementation of the system illustrated in FIG. 5 in which the switch can include a transistor.

The switch 512 can include, for example, a relay, a microelectromechanical (MEMS) switch, a transistor, the like, or any combination thereof. If the switch 512 includes a transistor, then the transistor can be, for example, a bipolar junction transistor (BJT), a junction gate field-effect transistor (JFET), a metal-oxide-semiconductor field-effect transistor (MOSFET), the like, or any combination thereof. In an implementation, the switch 512 can be an n-channel MOSFET (NMOSFET) 602 as illustrated in FIG. 6. A source terminal of the NMOSFET 602 can be connected to the first ground 504. A drain terminal of the NMOSFET 602 can be connected to the node 506. A gate terminal of the NMOSFET 602 can be connected to the first controller 514.

The first controller 514 can be configured to transmit data as binary digits. For example, a first binary digit can be represented by a current level through the resistor 502 being greater than a threshold current level of the system 500 and a second binary digit can be represented by the current level through the resistor 502 being zero. Alternatively, for example, the first binary digit can be represented by a transition, at a specific point in a cycle, of the current level through the resistor 502 from being greater than the threshold current level of the system 500 to being zero, and the second binary digit can be represented by a transition, at the specific point in the cycle, of the current level through the resistor 502 from being zero to being greater than the threshold current level of the system 500. In this example, the binary digits can be represented using Manchester coding. In this example, the cycle can be a cycle of a clock (not illustrated) for the first controller 514.

The comparator 516 can be configured to produce a signal. The comparator 516 can be configured to compare the voltage level at the node 506 to a threshold level to produce the signal. For example, the signal can be at a first voltage level of the system 500 in response to a voltage level at the node 506 being greater than a threshold voltage level. The signal can be at a second voltage level of the system 500 in response to the voltage level at the node 506 being less than the threshold voltage level. In a realization, the comparator 516 can be Part No. ADCMP361 provided by Analog Devices, Inc. of Norwood, Mass.

The system 500 can be configured to receive data as binary digits. For example, a first binary digit can be represented by the first voltage level of the system 500 and a second binary digit can be represented by the second voltage level of the system 500. Alternatively, for example, the first binary digit can be represented by a transition, at a specific point in a cycle, from the first voltage level of the system 500 to the second voltage level of the system 500, and the second binary digit can be represented by a transition, at the specific point in the cycle, from the second voltage level of the system 500 to the first voltage level of the system 500. In this example, the binary digits can be represented using Manchester coding. In this example, the cycle can be a cycle of a clock (not illustrated) for a controller of a device that transmitted the data. For example, the controller of the device that transmitted the data can be the first controller 108 of the system 100. (See FIG. 1.)

Optionally, the system 500 can further include a second controller 520. The second controller 520 can be configured to receive the signal produced by the comparator 516. Alternatively, one or more functions of the first controller 514 and one or more functions of the second controller 520 can be realized in a combined controller 522.

The voltage regulator 518 can be configured to provide, in response to the voltage level at the node 506 being within a range of voltages, the electrical power, at a voltage level greater than or equal to a threshold voltage level, to the second port 510. The threshold voltage level can be a minimum voltage requirement of the load configured to be connected to the second port 510. The voltage regulator 518 can include a switching regulator, a silicon controlled rectifier (SCR) regulator, a linear regulator, a low-dropout regulator, a buck converter, the like, or any combination thereof. Optionally, if the voltage regulator 518 does not include circuitry to prevent back powering, then the system 500 can include a diode 524. The diode 524 can be connected between the node 506 and the voltage regulator 518. For example, the diode 524 can be a Schottky diode. Optionally, if the voltage regulator 518 does not include circuitry to provide capacitance at an input of the voltage regulator 518, then the system 500 can include a capacitor 526. The capacitor 526 can be connected to the node 506. Alternatively, if the system 500 includes both the diode 524 and the capacitor 526, then the capacitor 526 can be connected between the diode 524 and the voltage regulator 518.

The system 500 can be configured to convey only the electrical power by having the switch 512 in a nonconductive state so that the electrical power can be conveyed from the first port 508 to the second port 510 via the voltage regulator 518.

The system 500 can be configured to transmit data as binary digits to another device by having the first controller 514 cause the switch 512 to be in the nonconductive state or a conductive state to cause the current level through the resistor 502 to be zero or to be greater than the threshold current level of the system 500. The supply of the electrical power can be configured to produce, at the node 506, the electrical power within the range of voltages even when the current level through the resistor 502 is greater than the threshold current level of the system 500. The voltage regulator 518 can be configured to provide, in response to the voltage level at the node 506 being within the range of voltages, the electrical power, at the voltage level greater than or equal to the threshold voltage level, to the second port 510. In this manner, the system 500 can be configured to convey the electrical power even when the system 500 is transmitting the data to the other device. For example, the other device can be the system 100. (See FIG. 1.) In this example, the range of voltages can include the first voltage level of the system 100 adjusted for any voltage drops across one or more switches and/or diodes that may be disposed between the first port 104 of the system 100 and the node 506. In this example, the range of voltages can include the second voltage level of the system 100 adjusted for any voltage drops across one or more switches and/or diodes that may be disposed between the output of the voltage regulator 110 and the node 506.

The system 500 can be configured to receive data as binary digits from another device by having the comparator 516 produce a signal at the first voltage level, in response to the voltage level at the node 506 being greater than the threshold voltage level, and at the second voltage level, in response to the voltage level at the node 506 being less than the threshold voltage level. The voltage regulator 518 can be configured to provide, in response to the voltage level at the node 506 being within the range of voltages, the electrical power, at the voltage level greater than or equal to the threshold voltage level, to the second port 510. In this manner, the system 500 can be configured to convey the electrical power even when the system 500 is receiving the data from the other device. For example, the other device can be the system 100. (See FIG. 1.) In this example, the range of voltages can include the first voltage level of the system 100 adjusted for any voltage drops across one or more switches and/or diodes that may be disposed between the first port 104 of the system 100 and the node 506. In this example, the range of voltages can include the second voltage level of the system 100 adjusted for any voltage drops across one or more switches and/or diodes that may be disposed between the output of the voltage regulator 110 and the node 506.

Figure 7:
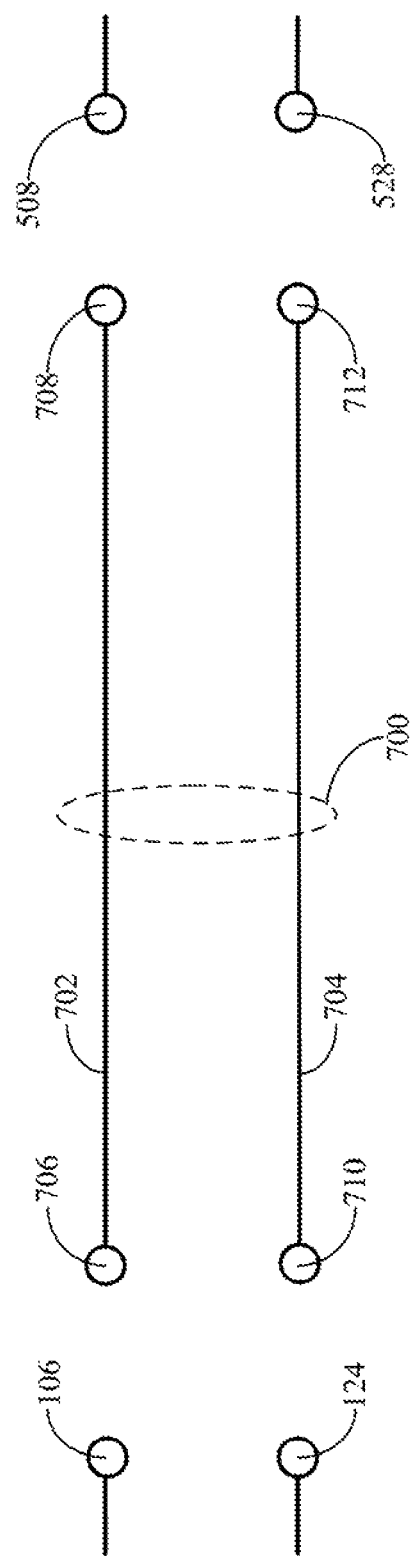
FIG. 7 is a block diagram of an example of two wires that can connect the system illustrated in FIG. 1 to the system illustrated in FIG. 5.

FIG. 7 is a block diagram of an example of two wires 700 that can connect the system 100 to the system 500. The two wires 700 can include a first wire 702 and a second wire 704. In a realization, each of the first wire 702 and the second wire 704 can have a length less than or equal to 50 meters. The first wire 702 can have a first end 706 and a second end 708. The second wire 704 can have a first end 710 and a second end 712. The second port 106 of the system 100 can be configured to be connected to the first end 706 of the first wire 702. A third port 124 of the system 100, connected to the ground 116 of the system 100, can be configured to be connected to the first end 710 of the second wire 704. The first port 508 of the system 500 can be configured to be connected to the second end 708 of the first wire 702. A third port 528 of the system 500, connected to the first ground 504 of the system 500, can be configured to be connected to the second end 712 of the second wire 704. A connector to connect a port of a system to an end of a wire can include a plug and jack connector, a plug and socket connector, a terminal block, a terminal board, a terminal strip, a crimp connector, a banana connector, an alligator connector, a binding post, a screw terminal, a fast-on terminal, a quick-disconnect terminal, a blade connector, a ring terminal, a spade terminal, a Universal Serial Bus (USB) connector, the like, or any combination thereof.

With reference to FIGS. 1, 5, 7, and 10, for example, the system 100 can be disposed in the room 1002 in which the heat generator 1004 is installed, and the system 500 can be disposed in the thermostat 1008. For example, the thermostat 1008 can sense a temperature within a house 1012. A value of the temperature within the house 1012 can be encoded as a first binary number represented by a first set of binary digits. The first controller 514 (or the combined controller 522) of the system 500 can cause the first set of binary digits to be transmitted from the system 500, via the two wires 700, to the system 100. The second controller 118 (or the combined controller 120) of the system 100 can receive the first set of binary digits. In response to receipt of the first set of binary digits, the second controller 118 (or the combined controller 120) of the system 100 can cause a position of a fuel valve of the heat generator 1004 to change by an increment. The position of the fuel valve can be encoded as a second binary number represented by a second set of binary digits. The first controller 108 (or the combined controller 120) of the system 100 can cause the second set of binary digits to be transmitted from the system 100, via the two wires 700, to the system 500. The second controller 520 (or the combined controller 522) of the system 500 can receive the second set of binary digits. In response to receipt of the second set of binary digits, the second controller 520 (or the combined controller 522) of the system 500 can determine a duration of time. In response to a passing of the duration of time, a value of the temperature within the house 1012 can be encoded as a third binary number represented by a third set of binary digits. The first controller 514 (or the combined controller 522) of the system 500 can cause the third set of binary digits to be transmitted from the system 500, via the two wires 700, to the system 100. The second controller 118 (or the combined controller 120) of the system 100 can receive the third set of binary digits. In response to receipt of the third set of binary digits, the second controller 118 (or the combined controller 120) of the system 100 can cause a speed of a blower of the heat generator 1004 to change by an increment. The speed of the blower can be encoded as a fourth binary number represented by a fourth set of binary digits. The first controller 108 (or the combined controller 120) of the system 100 can cause the fourth set of binary digits to be transmitted from the system 100, via the two wires 700, to the system 500. The second controller 520 (or the combined controller 522) of the system 500 can receive the fourth set of binary digits. In this manner, data can be communicated between the thermostat 1008 and the heat generator 1004 to improve efforts to modulate operations of various components of the heat generator 1004.

With reference to FIG. 5, optionally, the system 500 can include polarity agnostic circuitry 530. The polarity agnostic circuitry 530 can be connected to the node 506, the first ground 504, the first port 508, and the third port 528. The third port 528 can be configured to be connected to the supply (not illustrated) of the electrical power. The supply can have a first lead and a second lead. With reference to FIGS. 5 and 7, for example, the first lead can be the second end 708 of the first wire 702 and the second lead can be the second end 712 of the second wire 704. The first lead can be at a voltage level. For example, the voltage level can be the voltage level at the second port 106 of the system 100. The second lead can be at a second ground. For example, the second ground can be the ground 116 of the system 100 at the third port 124 of the system 100. If the system 500 includes the polarity agnostic circuitry 530 and the first port 508 is connected to the first lead (e.g., the second end 708 of the first wire 702), then the third port 528 can be connected to the second lead (e.g., the second end 712 of the second wire 704). Conversely, if the system 500 includes the polarity agnostic circuitry 530 and the first port 508 is connected to the second lead (e.g., the second end 712 of the second wire 704), then the third port 528 can be connected to the first lead (e.g., the second end 708 of the first wire 702).

Figure 8:
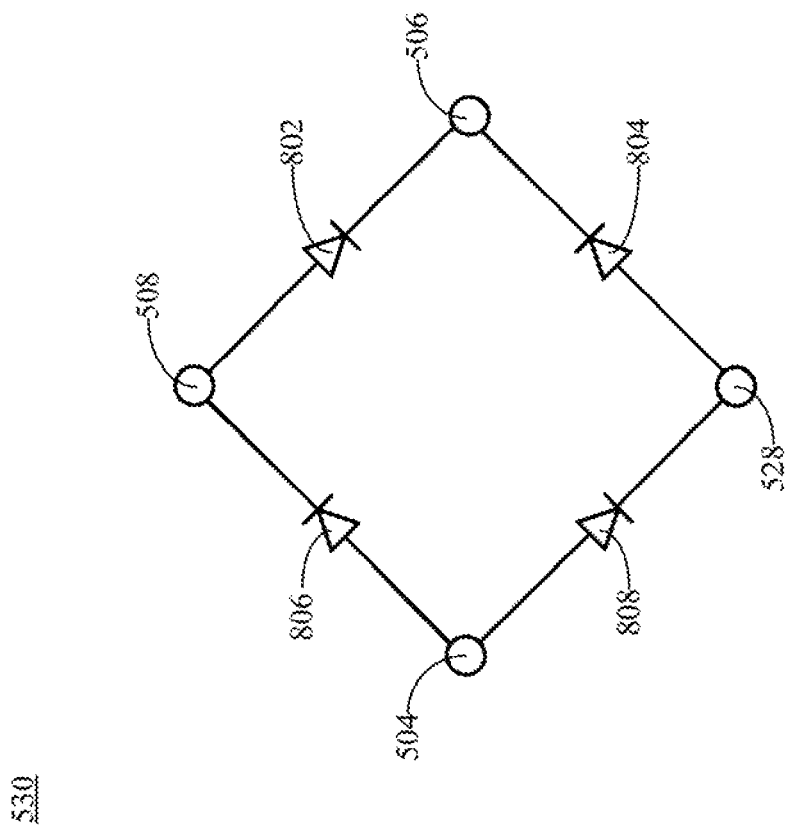
FIG. 8 is a block diagram of an example implementation of the polarity agnostic circuitry illustrated in FIG. 5.

FIG. 8 is a block diagram of an example implementation of the polarity agnostic circuitry 530. The polarity agnostic circuitry 530 can include a first diode 802, a second diode 804, a third diode 806, and a fourth diode 808. With reference to FIGS. 5 and 8, the first diode 802 can have a cathode connected to the node 506 and an anode connected to the first port 508. For example, the first diode 802 can be a Schottky diode. The second diode 804 can have a cathode connected to the node 506 and an anode connected to the third port 528. For example, the second diode 804 can be a Schottky diode. The third diode 806 can have a cathode connected to the first port 508 and an anode connected to the first ground 504. For example, the third diode 806 can be a Schottky diode. The fourth diode 808 can have a cathode connected to the third port 528 and an anode connected to the first ground 504. For example, the fourth diode 808 can be a Schottky diode. The first port 508 can be configured to be connected to one of the first lead or the second lead. The third port 528 can be configured to be connected to one of the first lead or the second lead such that a lead connected to the first port 508 is different from a lead connected to the third port 528. With reference to FIGS. 5, 7, and 8, for example, the first lead can be the second end 708 of the first wire 702 and the second lead can be the second end 712 of the second wire 704. If the system 500 includes the polarity agnostic circuitry 530 and the first port 508 is connected to the first lead (e.g., the second end 708 of the first wire 702), then the third port 528 can be connected to the second lead (e.g., the second end 712 of the second wire 704). Conversely, if the system 500 includes the polarity agnostic circuitry 530 and the first port 508 is connected to the second lead (e.g., the second end 712 of the second wire 704), then the third port 528 can be connected to the first lead (e.g., the second end 708 of the first wire 702).

FIG. 9 is a flow diagram of an example of a method 900 for superimposed conveyance of data and electrical power according to the disclosed subject matter. In the method 900, at an operation 902, a first switch can be caused to change from a conductive state to a nonconductive state, to change from the nonconductive state to the conductive state, or both to convey the electrical power and data from a first device to a second device. The data from the first device can be represented by binary digits. A first binary digit of the data from the first device can be represented by a transition, of a voltage level at a node of the second device and at a specific point in a first cycle, from a first voltage level to a second voltage level. A second binary digit of the data from the first device can be represented by a transition, of the voltage level at the node of the second device and at the specific point in the first cycle, from the second voltage level to the first voltage level. For example, the first cycle can be a cycle of a clock for a controller of the first switch.

At an operation 904, a second switch can be caused to change from the conductive state to the nonconductive state, to change from the nonconductive state to the conductive state, or both to convey data from the second device to the first device. The data from the second device can be represented by the binary digits. A first binary digit of the data from the second device can be represented by a transition, of a current level through a component of the first device and at a specific point in a second cycle, from being less than a threshold current level to being greater than the threshold current level. A second binary digit of the data from the second device can be represented by a transition, of the current level through the component of the first device and at the specific point in the second cycle, from being greater than the threshold current level to being less than the threshold current level. For example, the second cycle can be a cycle of a clock for a controller of the second switch.

At an operation 906, the electrical power, at a voltage level greater than or equal to a threshold voltage level, can be provided, by a voltage regulator of the second device and in response to the voltage level at the node being within a range of voltages that includes the first voltage level and the second voltage level, to one or more components.

For example, conveyance of the data from the first device to the second device can occur at a first time and conveyance of the data from the second device to the first device can occur at a second time. The second time can be different from the first time.

Alternatively, for example, conveyance of the data from the first device to the second device and conveyance of the data from the second device to the first device can occur concurrently. With reference to FIGS. 1 and 5, in a realization of this example, each of the first voltage level of the system 100, the second voltage level of the system 100, and the resistance of the resistor 502 of the system 500 can be designed to have values so that the current level through the current measurement circuitry 112 of the system 100 can be sufficiently large enough to represent the binary digits of the data conveyed from the second device to the first device even when the voltage regulator 518 of the system 500 draws additional current, in response to the voltage level at the node 506 of the system 500 changing from the being greater than the threshold voltage level of the system 500 to being less than the threshold voltage level of the system 500, to maintain a level of power provided to the load connected to the second port 510 of the system 500.

Figure 10:
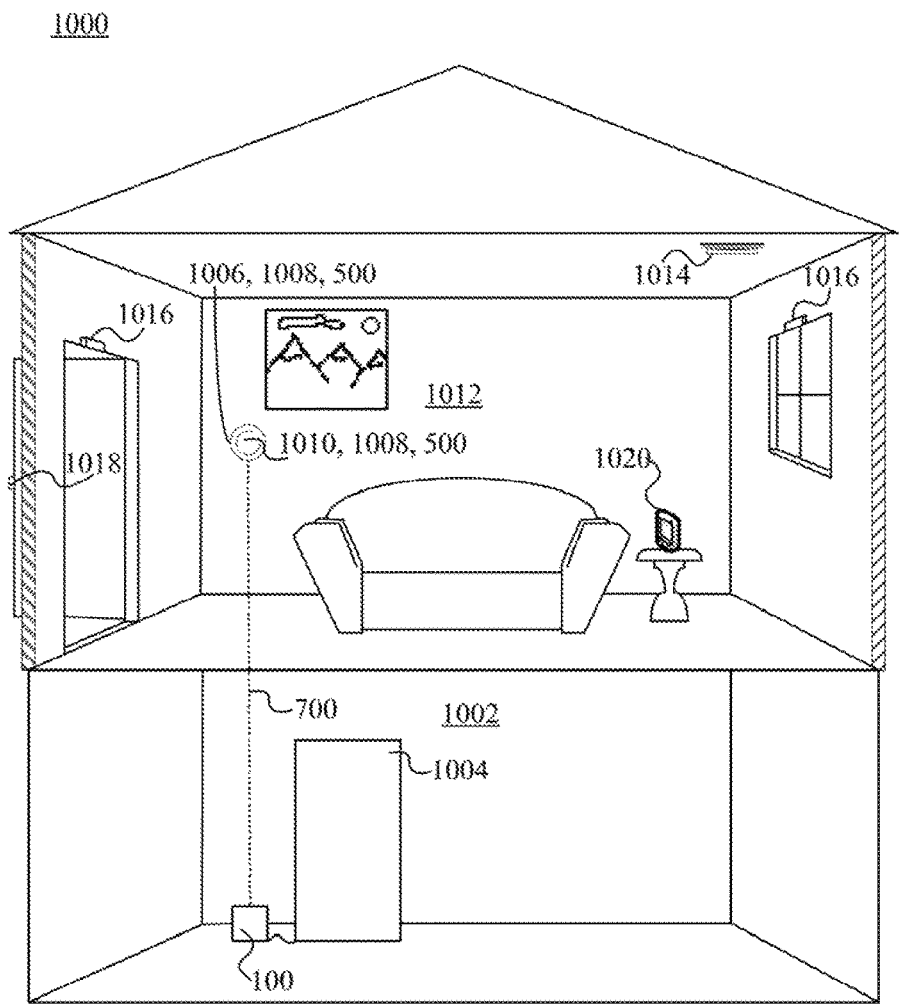
FIG. 10 is a diagram of an example environment for the system illustrated in FIG. 1 and the system illustrated in FIG. 5.

FIG. 10 is a diagram of an example environment for the system 100 and the system 500. For example, the environment can include a security system integrated in a smart home environment that can include sensors, interface components, and one or more processing units that process data generated by the sensors and that control the interface components. Data from the sensors can be used to determine the occurrence of a security breach or security related event, such as entry through a window of the premises, lengthy presence of an individual in an unusual location and an unusual time, or tampering with a lock of a door of the premises, etc. Upon the occurrence of such an event, the security system can determine, based on any of various algorithms, that an alarm is warranted and enter into an alarm mode, which can include automatically notifying a third party monitoring service as well as operating components of the system to provide visual and/or audible alerts, such as a siren sound, repeated beeping sound, or flashing lights.

Additionally, the security system can determine where a security breach has occurred and thereafter track the location of the unauthorized party, as well as the locations of authorized parties within and/or around the premises. Additionally, in view of the high stress levels that can accompany experiencing an unauthorized intrusion, the security system can announce the location of the security breach and the location of the unauthorized party within the premises. In so doing the authorized occupants are automatically warned of which locations in/around the premises to avoid and the unauthorized party is simultaneously deterred from further advance due to the clear notice to the unauthorized party that he/she is being tracked. Alternatively, the location of the unauthorized party can be announced only to select devices so as to inform an authorized user while leaving the unauthorized party unaware that he/she is being tracked.

The security system can function as a subsystem of a smart facility network system and can incorporate a plurality of electrical and/or mechanical components, including intelligent, sensing, network-connected devices that can communicate with each other and/or can communicate with a central server or a cloud-computing system to provide any of a variety of security (and/or environment) management objectives in a home, office, building or the like. Such objectives, which can include, for example, managing alarms, notifying third parties of alarm situations, managing door locks, monitoring the premises, etc., herein are collectively referred to as "premises management."

A premises management system can further include other subsystems that can communicate with each other to manage different aspects of premises management as well as security. For example, a security subsystem can manage the arming, disarming, and activation of alarms and other security aspects of the premises, and a smart home environment subsystem can handle aspects such as light, temperature, and hazard detection of the premises. However, the premises management system can leverage data obtained in one subsystem to improve the functionality of another subsystem.

The security system can be operable to function in any of various modes or states. For example, security system modes can include "stay", "away" and "home" modes. In a "stay" mode the security system can operate under the assumption that authorized parties are present within the premises but will not be entering/leaving without notifying the system; therefore data from certain interior sensors can be given lower weight in determining whether an unauthorized party is present. In an "away" mode the security system can operate under the assumption that no authorized parties are in the premises; therefore data from all sensors, interior and exterior, can be accorded high weight in determining whether an unauthorized party is present. In a "home" mode the security system can operate under the assumption that authorized parties are within the premises and will be freely entering/leaving the premises without notifying the system; therefore data from certain sensors interior and exterior can be accorded low weight in determining whether an unauthorized party is present. It should be understood that these modes are merely examples and can be modified, removed, or supplemented by other modes.

Additionally, the security system can function in any of various alarm states. For example, in a "green" or "low" alarm state the security system can operate under the assumption that all is well and no unauthorized parties have been detected within/around the premises. In a "yellow" or "medium" alarm state the security system can operate under the assumption that an unauthorized party is potentially present in or around the premises. In this state certain sensor data can be analyzed differently or additional confirmations of authorization, such as entering a code, can be required of to avoid escalation to a higher alarm state. In a "red" or "high" alarm state the security system can operate under the assumption that an unauthorized party has been detected on the premises and preventive measures can be taken, such as notifying a third party monitoring service and/or activating an alarm and announcement, as will be described later. It should be understood that greater or fewer gradients of alarm state can be included. Hereinafter, a heightened alarm can refer to an alarm state above the low alarm state.

The security system can be implemented as a stand-alone system or, as mentioned above, as a subsystem of a larger premises management system and can leverage data therefrom. For illustrative purposes and to demonstrate the cross use of data among systems, the security system can be part of a premises management system, such as a smart home network environment.

The individual hardware components of the premises management system that can be used to monitor and affect the premises in order to carry out premises management can be referred to as "premises management devices." The premises management devices described herein can include multiple physical hardware and firmware configurations, along with circuitry hardware (e.g., processors, memory, etc.), firmware, and software programming that are configured to carry out the methods and functions of a premises management system. The premises management devices can be controlled by a "brain" component, which can be implemented in a controller device.

FIG. 10 is a diagram of an example premises management system 1000, installed within premises that include a house 1012 with the room 1002 in which the heat generator 1004 is installed. The system 1000 can implement subsystems, including the security system, via multiple types of premises management devices, such as one or more intelligent, multi-sensing, network-connected thermostats 1008, one or more intelligent, multi-sensing, network-connected hazard detection units 1014, one or more intelligent, multi-sensing, network-connected entry detection units 1016, one or more network-connected door handles 1018, one or more intelligent, multi-sensing, network-connected controller devices 1020, or any combination thereof. Data from any of these premise management devices can be used by the security system, as well as for the respective primary functions of the premise management devices.

At a high level, the system 1000 can be configured to operate as a learning, evolving ecosystem of interconnected devices. New premises management devices can be added, introducing new functionality, expanding existing functionality, or expanding a spatial range of coverage of the system. Furthermore, existing premises management devices can be replaced or removed without causing a failure of the system 1000. Such removal can encompass intentional or unintentional removal of components from the system 1000 by an authorized user, as well as removal by malfunction (e.g., loss of power, destruction by intruder, etc.). Due to the dynamic nature of the system, the overall capability, functionality and objectives of the system 1000 can change as the constitution and configuration of the system 1000 change.

In order to avoid contention and race conditions among the interconnected devices, certain decisions, such as those that affect the premises management system 1000 at a system level or that involve data from multiple sources, can be centralized in the aforementioned "brain" component. The brain component can coordinate decision making across the system 1000 or across a designated portion thereof. The brain component is a system element at which, for example, sensor/detector states can converge, user interaction can be interpreted, sensor data can be received, and decisions can be made concerning the state, mode, or actions of the system 1000. Hereinafter, the system 1000 brain component can be referred to as the "primary system processor." The function of primary system processor can be implemented in the controller device 1020, for example, hard coded into a single device, or distributed virtually among one or more premises management devices within the system using computational load sharing, time division, shared storage, or other techniques.

However implemented, the primary system processor can be configured to control subsystems and components of the premises management system 1000, such as, for example, the disclosed security system and/or a smart home environment system. Furthermore, the primary system processor can be communicatively connected to control, receive data from, or transmit data to premises management devices within the system, as well as receive data from or transmit data to devices/systems external to the system 1000, such as third party servers, cloud servers, mobile devices, and the like.

In the embodiments disclosed herein, each of the premises management devices can include one or more sensors. In general, a "sensor" can refer to any device that can obtain information about its local environment and communicate that information in the form of data that can be stored or accessed by other devices and/or systems. Sensor data can form the basis of inferences drawn about the sensor's environment. For example, the primary system processor can use data from a plurality of sensors, e.g., including entry detection unit 1016, to determine whether an unauthorized party is attempting enter the house 1012 through a window.

A brief description of sensors that may be included in the system 1000 follows. Examples provided are not intended to be limiting but are merely provided as illustrative subjects. The system 1000 can use data from the types of sensors in order to implement features of a security system. The system 1000 can employ data from any type of sensor that provides data from which an inference can be drawn about the environment in or around the house 1012.

Generally, sensors can be described by the type of information they collect. For example, sensor types can include motion, smoke, carbon monoxide, proximity, temperature, time, physical orientation, acceleration, location, entry, presence, pressure, light, sound, and the like. A sensor also can be described in terms of the particular physical device that obtains the environmental information. For example, an accelerometer can obtain acceleration information, and thus can be used as a general motion sensor and/or an acceleration sensor. A sensor also can be described in terms of the specific hardware components used to implement the sensor. For example, a temperature sensor can include a thermistor, thermocouple, resistance temperature detector, integrated circuit temperature detector, or combinations thereof.

A sensor further can be described in terms of a function or functions the sensor performs within the system 1000. For example, a sensor can be described as a security sensor when it is used to determine security events, such as unauthorized entry.

A sensor can be operated for different functions at different times. For example, system 1000 can use data from a motion sensor to determine how to control lighting in the house 1012 when an authorized party is present and use the data as a factor to change a security system mode or state on the basis of unexpected movement when no authorized party is present. In another example, the system 1000 can use the motion sensor data differently when a security system mode is in an "away" mode versus a "home" state, i.e., certain motion sensor data can be ignored while the system is in a "home" mode and acted upon when the system is in an "away" mode.

In some cases, a sensor can operate as multiple sensor types sequentially or concurrently, such as where a temperature sensor is used to detect a change in temperature, as well as the presence of a person or animal. A sensor also can operate in different modes (e.g., different sensitivity or threshold settings) at the same or different times. For example, a sensor can be configured to operate in one mode during the day and another mode at night. As another example, a sensor can operate in different modes based upon a mode or the disclosed security system, state of system 1000, or as otherwise directed by the primary system processor.

Multiple sensors can be arranged in a single physical housing, such as where a single device includes movement, temperature, magnetic, and/or other sensors. Such a housing can also be referred to as a sensor, premises management device, or a sensor device. For clarity, sensors can be described with respect to the particular functions they perform and/or the particular physical hardware used.

Figure 11:
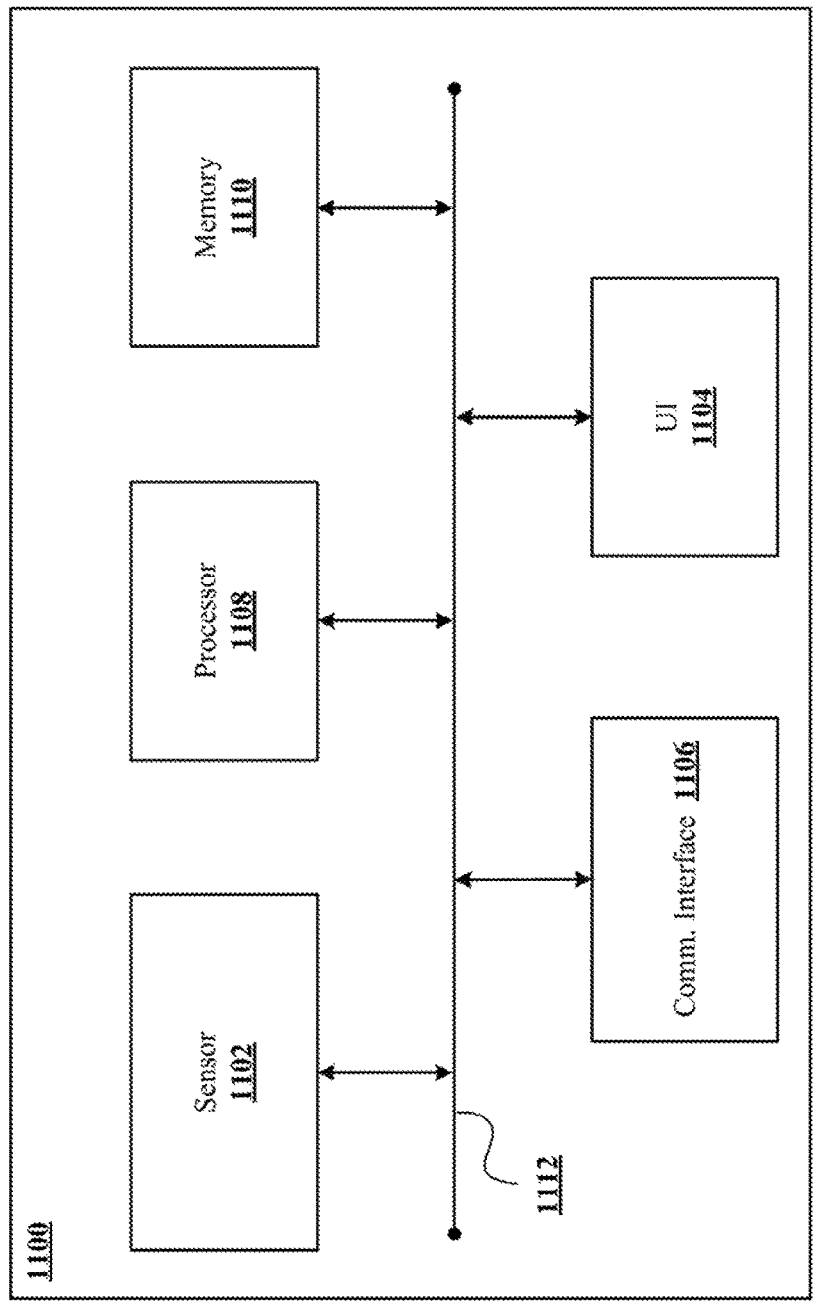
FIG. 11 is a block diagram of an example of a premises management device.

FIG. 11 is a block diagram of an example of an embodiment of a premises management device 1100. Premise management device 1100 can include a processor 1108, a memory 1110, a user interface (UI) 1104, a communications interface 1106, an internal bus 1112, and a sensor 1102. A person of ordinary skill in the art appreciates that various components of the premises management device 1100 described herein can include additional electrical circuit(s). Furthermore, it is appreciated that many of the various components listed above can be implemented on one or more integrated circuit (IC) chips. For example, in one embodiment, a set of components can be implemented in a single IC chip. In other embodiments, one or more of respective components can be fabricated or implemented on separate IC chips.

The sensor 1102 can be an environmental sensor, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, compass, or any other environmental sensor that obtains or provides a corresponding type of information about the environment in which the premises management device 1100 is located.

The processor 1108 can be a central processing unit (CPU) or other type of processor and can be communicably connected to the other components to receive and analyze data obtained by the sensor 1102, can transmit messages or packets that control operation of other components of the premises management device 1100 and/or external devices, and can process communications between the premises management device 1100 and other devices. The processor 1108 can execute instructions and/or computer executable components stored on the memory 1110. Such computer executable components can include, for example, a primary function component to control a primary function of the premises management device 1100 related to managing a premises, a communication component to locate and communicate with other compatible premises management devices, a computational component to process system related tasks, or any combination thereof.

The memory 1110 or another memory in the premises management device 1100 can also be communicably connected to receive and store environmental data obtained by the sensor 1102. A communication interface 1106 can function to transmit and receive data using a wireless protocol, such as a WiFi™, Thread®, or other wireless interface, Ethernet® or other local network interface, Bluetooth® or other radio interface, or the like and can facilitate transmission and receipt of data by the premises management device 1100 to and from other devices.

The user interface (UI) 1104 can provide information and/or receive input from a user of the system 1000. The UI 1104 can include, for example, a speaker to output an audible sound when an event is detected by the premises management device 1100. Alternatively or additionally, the UI 1104 can include a light to be activated when an event is detected by the premises management device 1100. The UI 1104 can be relatively minimal, such as a liquid crystal display (LCD), light-emitting diode (LED) display, or limited-output display, or it can be a full-featured interface such as a touchscreen, keypad, or selection wheel with a click-button mechanism to enter input.

Internal components of the premises management device 1100 can transmit and receive data to and from one another via an internal bus 1112 or other mechanism. One or more components can be implemented in a single physical arrangement, such as where multiple components are implemented on a single integrated circuit. Premises management devices 1100 can include other components, and/or may not include all of the components illustrated.

The sensor 1102 can obtain data about the premises, and at least some of the data can be used to implement the security system. Through the bus 1112 and/or communication interface 1106, sensor data can be transmitted to or accessible by other components of the system 1000. Generally, two or more sensors 1102 on one or more premises management devices 1100 can generate data that can be coordinated by the primary system processor to determine a system response and/or infer a state of the environment. In one example, the primary system processor of the system 1000 can infer a state of intrusion based on data from entry detection sensors and motion sensors and, based on the determined state, further determine whether an unauthorized party is present and a location, within the premises, of the unauthorized party.

Figure 12:
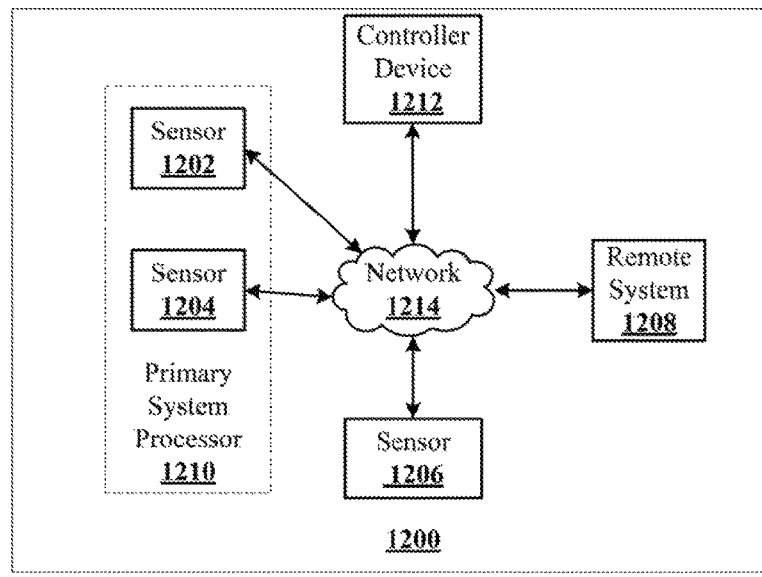
FIG. 12 is a block diagram of an example of a premises management system.

FIG. 12 is a block diagram of an example of an embodiment of a premises management system 1200. The premises management system 1200 can include security system features. System 1200 can be implemented over any suitable wired and/or wireless communication networks. One or more premises management devices, i.e., sensors 1202, 1204, 1206, and one or more controller devices 1212 can communicate via a local network 1214, such as a WiFi™ or other suitable network, with each other. The network 1214 can include a mesh-type network such as Thread®, which can provide network architecture and/or protocols for devices to communicate with one another. An authorized party can therefore interact with the premises management system 1200, for example, using the controller device 1212, which can communicate with the rest of the system 1200 via the network 1214.

The controller device 1212 and/or one or more of the sensors 1202, 1204, 1206, can be configured to implement a primary system processor 1210. The primary system processor 1210 can, for example, receive, aggregate, and/or analyze environmental information received from the sensors 1202, 1204, 1206, and the controller device 1212. Furthermore, a portion or percentage of the primary system processor 1210 can be implemented in a remote system 1208, such as a cloud-based reporting and/or analysis system. The remote system 1208 can, for example, independently aggregate data from multiple locations, provide instruction, software updates, and/or aggregated data to a controller 1212, primary system processor 1210, and/or sensors 1202, 1204, 1206.

The sensors 1202, 1204, 1206, can be disposed locally to one another, such as within a single dwelling, office space, building, room, or the like, or they may be disposed remote from each other, such as at various locations around a wide perimeter of a premises. In some embodiments, sensors 1202, 1204, 1206, can communicate directly with one or more remote systems 1208. The remote system 1208 can, for example, aggregate data from multiple locations, provide instruction, software updates, and/or aggregated data to the primary system processor 1210, controller device 1212, and/or sensors 1202, 1204, 1206. Additionally, remote system 1208 can refer to a system or subsystem that is a part of a third party monitoring service or a law enforcement service.

The premises management system illustrated in FIG. 12 can be a part of a smart-home environment, which can include a structure, such as a house, office building, garage, mobile home, or the like. The devices of the smart home environment, such as the sensors 1202, 1204, 1206, and the network 1214 can be integrated into a smart-home environment that does not include an entire structure, such as a single unit in an apartment building, condominium building, or office building.

The smart home environment can control and/or be coupled to devices outside of the structure. For example, one or more of the sensors 1202, 1204 can be located outside the structure at one or more distances from the structure (e.g., sensors 1202, 1204 can be disposed outside the structure, at points along a land perimeter on which the structure is located, or the like. One or more of the devices in the smart home environment may not be physically within the structure. For example, the controller 1212, which can receive input from the sensors 1202, 1204, can be located outside of the structure.

The structure of the smart-home environment can include a plurality of rooms, separated at least partly from each other via walls. The walls can include interior walls or exterior walls. Each room can further include a floor and a ceiling. Devices of the smart-home environment, such as the sensors

1202, 1204, can be mounted on, integrated with, and/or supported by a wall, floor, or ceiling of the structure.

The controller device 1212 can be a general or special-purpose controller. For example, one type of controller device 1212 can be a general-purpose computing device running one or more applications that collect and analyze data from one or more sensors 1202, 1204, 1206 within the home. In this case, the controller device 1212 can be implemented using, for example, a mobile computing device such as a mobile phone, a tablet computer, a laptop computer, a personal data assistant, or wearable technology. Another example of a controller device 1212 can be a special-purpose controller that is dedicated to a subset of functions, such as a security controller that collects, analyzes and provides access to sensor data primarily or exclusively as it relates to various security considerations for a premises. The controller device 1212 can be located locally with respect to the sensors 1202, 1204, 1206 with which it can communicate and from which it can obtain sensor data, such as in the case where it is positioned within a home that includes a home automation and/or sensor network. Alternatively or additionally, controller device 1212 can be remote from the sensors 1202, 1204, 1206, such as where the controller device 1212 is implemented as a cloud-based system that can communicate with multiple sensors 1202, 1204, 1206, which can be located at multiple locations and can be local or remote with respect to one another.

Sensors 1202, 1204, 1206 can communicate with each other, the controller device 1212, and the primary system processor 1210 within a private, secure, local communication network that can be implemented wired or wirelessly, and/or a sensor-specific network through which sensors 1202, 1204, 1206 can communicate with one another and/or with dedicated other devices. Alternatively, as illustrated in FIG. 12, one or more sensors 1202, 1204, 1206 can communicate via a common local network 1214, such as a Wi-Fi™, Thread®, or other suitable network, with each other, and/or with the controller 1212 and primary system processor 1210. Alternatively or additionally, sensors 1202, 1204, 1206 can communicate directly with a remote system 1208.

The smart-home environment, including the sensor network shown in FIG. 12, can include a plurality of premises management devices, including intelligent, multi-sensing, network-connected devices that can integrate seamlessly with each other and/or with a central server or a cloud-computing system (e.g., controller 1212 and/or remote system 1208) to provide home-security and smart-home features. Such devices can include one or more intelligent, multi-sensing, network-connected thermostats (e.g., "smart thermostats"), one or more intelligent, network-connected, multi-sensing hazard detection units (e.g., "smart hazard detectors"), one or more intelligent, multi-sensing, network-connected entryway interface devices (e.g., "smart doorbells"), or any combination thereof. The smart hazard detectors, smart thermostats, and smart doorbells can be, for example, the sensors 1202, 1204, 1206 illustrated in FIG. 12. These premises management devices can be used by the security system, but can also have separate, primary functions.

For example, a smart thermostat can detect ambient climate characteristics (e.g., temperature and/or humidity) and can accordingly control a heating, ventilating, and air conditioning (HVAC) system of the structure. For example, the ambient climate characteristics can be detected by sensors 1202, 1204, 1206 illustrated in FIG. 12, and the controller 1212 can control the HVAC system (not illustrated) of the structure. However, unusual changes in temperature of a given room can also provide data that can supplement a determination of whether a situation is a security concern, for example, detecting a rapid drop in temperature in a given room due to a broken in window.

As another example, a smart hazard detector can detect the presence of a hazardous substance or a substance indicative of a hazardous substance (e.g., smoke, fire, or carbon monoxide). For example, smoke, fire, and/or carbon monoxide can be detected by sensors 1202, 1204, 1206 illustrated in FIG. 12, and the controller 1212 can control an alarm system to provide a visual and/or audible alarm to the user of the smart-home environment. However, the speaker of the hazard detector can also be used to announce security related messages.

As another example, a smart doorbell can control doorbell functionality, detect a person's approach to or departure from a location (e.g., an outer door to the structure), and announce a person's approach or departure from the structure via an audible and/or visual message that can be output by a speaker and/or a display coupled to, for example, the controller 1212. However, the detection of an approach of an unknown party can provide data to the security system to supplement determining whether the presence of the unknown party is a security concern.

A smart-home environment can include one or more intelligent, multi-sensing, network-connected entry detectors (e.g., "smart entry detectors") that can be specifically designed to function as part of a security subsystem. Such detectors can be or can include one or more of the sensors 1202, 1204, 1206 illustrated in FIG. 12. The smart entry detectors can be disposed at one or more windows, doors, and other entry points of the smart-home environment to detect when a window, door, or other entry point is opened, broken, breached, and/or compromised. The smart entry detectors can generate a corresponding signal to be provided to the controller 1212, primary system processor 1210, and/or the remote system 1208 when a window or door is opened, closed, breached, and/or compromised. In some embodiments of the security system, the alarm, which can be included with controller 1212 and/or coupled to the network 1214, may not arm unless all smart entry detectors (e.g., sensors 1202, 1204, 1206) indicate that all doors, windows, entryways, and the like are closed and/or that all smart entry detectors are armed.

The smart thermostats, the smart hazard detectors, the smart doorbells, the smart entry detectors, and other premise management devices of a smart-home environment (e.g., as illustrated as sensors 1202, 1204, 1206 of FIG. 12) can be communicatively connected to each other via the network 1214, and to the controller 1212, primary system processor 1210, and/or remote system 1208.

One or more users can control one or more of the network-connected smart devices in the smart-home environment using a network-connected computer or portable electronic device. In some examples, some or all of the users (e.g., individuals who live in the home) can register their mobile device, token and/or key fobs with the smart-home environment (e.g., with the controller 1212). Such registration can be made at a central server (e.g., the controller 1212 and/or the remote system 1208) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user can also use their registered electronic device to control the network-connected smart devices when the user is located inside the smart-home environment.

As an alternative to or in addition to registering electronic devices, the smart-home environment can make inferences about which individuals live in the home and are therefore users and which electronic devices are associated with those individuals. As such, the smart-home environment can "learn" who is a user (e.g., an authorized user) and permit the electronic devices associated with those individuals to control the network-connected smart devices of the smart-home environment (e.g., devices communicatively coupled to the network 1214) including, in some embodiments, sensors used by or within the smart-home environment. Various types of notices and other information can be provided to users via messages sent to one or more user electronic devices. For example, the messages can be sent via e-mail, short message service (SMS), multimedia messaging service (MMS), unstructured supplementary service data (USSD), as well as any other type of messaging services and/or communication protocols.

Figure 13:
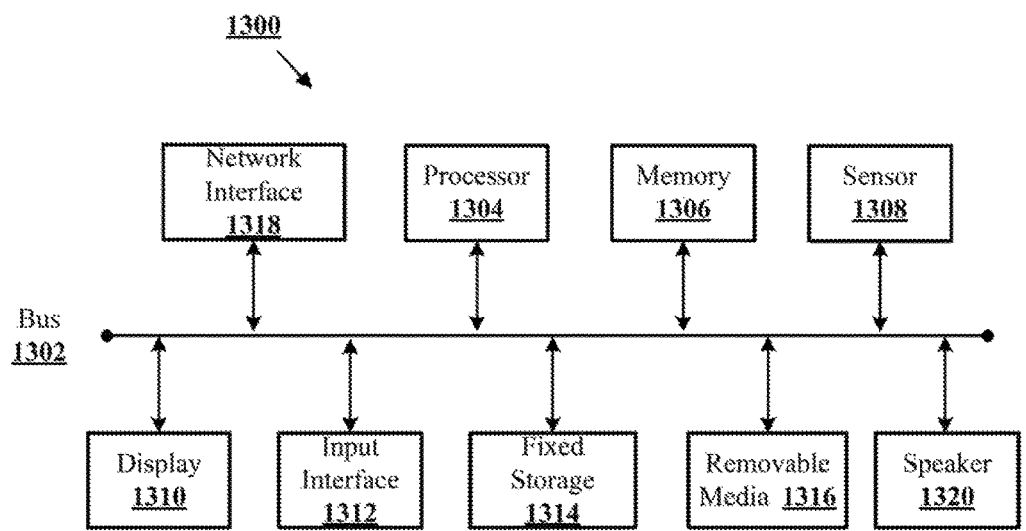
FIG. 13 is a block diagram of an example of a computing device suitable for implementing certain devices illustrated in FIGS. 1 through 6 and 10 through 12.

FIG. 13 is a block diagram of an example of a computing device 1300 suitable for implementing certain devices illustrated in FIGS. 1 through 6 and 10 through 12. The computing device 1300 can be used to implement, for example, the controller device 1212 or a premises management device including sensors as described above. The computing device 1300 can be constructed as a custom-designed device or can be, for example, a special-purpose desktop computer, laptop computer, or mobile computing device such as a smart phone, tablet, personal data assistant, wearable technology, or the like.

The computing device 1300 can include a bus 1302 that interconnects major components of the computing device 1300. Such components can include a central processor 1304; a memory 1306 (such as Random Access Memory (RAM), Read-Only Memory (ROM), flash RAM, or the like), a sensor 1308 (which can include one or more sensors), a display 1310 (such as a display screen), an input interface 1312 (which can include one or more input devices such as a keyboard, mouse, keypad, touch pad, turn-wheel, and the like), a fixed storage 1314 (such as a hard drive, flash storage, and the like), a removable media component 1316 (operable to control and receive a solid-state memory device, an optical disk, a flash drive, and the like), a network interface 1318 (operable to communicate with one or more remote devices via a suitable network connection), and a speaker 1320 (to output an audible communication). In some embodiments the input interface 1312 and the display 1310 can be combined, such as in the form of a touch screen.

The bus 1302 can allow data communication between the central processor 1304 and one or more memory components 1314, 1316, which can include RAM, ROM, or other memory. Applications resident with the computing device 1300 generally can be stored on and accessed via a computer readable storage medium.

The fixed storage 1314 can be integral with the computing device 1300 or can be separate and accessed through other interfaces. The network interface 1318 can provide a direct connection to the premises management system and/or a remote server via a wired or wireless connection. The network interface 1318 can provide such connection using any suitable technique and protocol, including digital cellular telephone, WiFi™, Thread®, Bluetooth®, near field communications (NFC), and the like. For example, the network interface 1318 can allow the computing device 1300 to communicate with other components of the premises management system or other computers via one or more local, wide-area, or other communication networks.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A system for superimposed conveyance of data and electrical power, the system comprising a first sub-system, the first sub-system comprising:
a first resistor connected between a first ground and a first node, the first node between a first port and a second port, the first port configured to be connected to a supply of the electrical power, the second port configured to be connected to a load;
a first switch connected in series with the first resistor;
a first controller configured to control operation of the first switch;
a first comparator connected to the first node; and
a first voltage regulator connected between the first node and the second port,
wherein the first sub-system is configured to convey both the data and the electrical power through the first node.

2. The system of claim 1, wherein the first resistor, the first switch, and the first comparator are disposed on a backplate of a thermostat.

3. The system of claim 1, wherein the first controller is disposed on a head unit of a thermostat.

4. The system of claim 1, wherein the first switch comprises a transistor.

5. The system of claim 4, wherein the transistor is an n-channel metal-oxide-semiconductor field-effect transistor (NMOSFET), a source terminal of the NMOSFET connected to the first ground, a drain terminal of the NMOSFET connected to the first node, and a gate terminal of the NMOSFET connected to the first controller.

6. The system of claim 1, wherein the first controller is configured to transmit the data as binary digits, a first binary digit being represented by a transition, at a specific point in a cycle, of a current level through the first resistor from being greater than a threshold current level to being zero, and a second binary digit being represented by a transition, at the specific point in the cycle, of the current level through the first resistor from being zero to being greater than the threshold current level.

7. The system of claim 1, further comprising a second controller, the second controller connected to the first comparator.

8. The system of claim 7, wherein the second controller is the first controller.

9. The system of claim 1, wherein the first comparator is configured to produce a first voltage level in response to a voltage level at the first node being greater than a threshold voltage level and to produce a second voltage level in response to the voltage level at the first node being less than the threshold voltage level, and wherein the system is configured to receive the data as binary digits, a first binary digit being represented by a transition, at a specific point in a cycle, from the first voltage level to the second voltage level, and a second binary digit being represented by a transition, at the specific point in the cycle, from the second voltage level to the first voltage level.

10. The system of claim 1, further comprising a diode connected between the first node and the first voltage regulator.

11. The system of claim 1, further comprising a capacitor connected to the first node.

12. The system of claim 1, further comprising polarity agnostic circuitry, the polarity agnostic circuitry connected to the first node, the first ground, the first port, and a third port, the third port configured to be connected to the supply of the electrical power, the supply having a first lead and a second lead, the first lead being at a voltage level, and the second lead being at a second ground.

13. The system of claim 12, wherein the polarity agnostic circuitry comprises:
   a first diode having a cathode of the first diode connected to the first node and an anode of the first diode connected to the first port;
   a second diode having a cathode of the second diode connected to the first node and an anode of the second diode connected to the third port;
   a third diode having a cathode of the third diode connected to the first port and an anode of the third diode connected to the first ground;
   a fourth diode having a cathode of the fourth diode connected to the third port and an anode of the fourth diode connected to the first ground, wherein the first port is configured to be connected to one of the first lead or the second lead, the third port is configured to be connected to one of the first lead or the second lead such that a lead connected to the first port is different from a lead connected to the third port.

14. A method for superimposed conveyance of data and electrical power, the method comprising:
   causing a first switch to at least one of change from a conductive state to a nonconductive state or change from the nonconductive state to the conductive state to convey the electrical power and data from a first device to a second device, the data from the first device being represented by binary digits, a first binary digit of the data from the first device being represented by a transition, of a voltage level at a node of the second device and at a specific point in a first cycle, from a first voltage level to a second voltage level, and a second binary digit of the data from the first device being represented by a transition, of the voltage level at the node of the second device and at the specific point in the first cycle, from the second voltage level to the first voltage level;
   causing a second switch to at least one of change from the conductive state to the nonconductive state or change from the nonconductive state to the conductive state to convey data from the second device to the first device, the data from the second device being represented by the binary digits, a first binary digit of the data from the second device being represented by a transition, of a current level through a component of the first device and at a specific point in a second cycle, from being less than a threshold current level to being greater than the threshold current level, and a second binary digit of the data from the second device being represented by a transition, of the current level through the component of the first device and at the specific point in the second cycle, from being greater than the threshold current level to being less than the threshold current level; and
   providing, by a voltage regulator of the second device and in response to the voltage level at the node being within a range of voltages that includes the first voltage level and the second voltage level, the electrical power, at a voltage level greater than or equal to a threshold voltage level, to at least one component.

15. The method of claim 14, wherein the first cycle is a cycle of a clock for a controller of the first switch and the second cycle is a cycle of a clock for a controller of the second switch.

16. The method of claim 14, wherein the causing the first switch occurs at a first time and the causing the second switch occurs at a second time, the second time different from the first time.

17. The method of claim 14, wherein the causing the first switch and the causing the second switch occur concurrently.

18. The system of claim 1, further comprising a second sub-system, the second sub-system comprising:
   a second switch connected between a third port and a fourth port, the third port configured to be connected to the supply of the electrical power, the supply being at a first voltage level;
   a second controller configured to control operation of the second switch;
   a second voltage regulator connected between the third port and the fourth port, the second voltage regulator configured to receive the electrical power regardless of a position of the second switch, the second voltage regulator configured to produce a second voltage level;
   current measurement circuitry connected between the third port and the second switch; and
   a second comparator connected to the current measurement circuitry.

19. The system of claim 18, wherein the fourth port is configured to be connected to the first port.

20. The system of claim 19, wherein the first sub-system is configured to be disposed in a thermostat.

21. The system of claim 20, wherein the thermostat is configured to receive the electrical power from the third port via the fourth port, the first port, and the second port.

22. The system of claim 18, wherein the second sub-system is configured to be disposed in a room in which a heat generator is installed.

23. The system of claim 18, wherein the second switch comprises a transistor.

24. The system of claim 23, wherein the transistor is a p-channel metal-oxide-semiconductor field-effect transistor (PMOSFET), a source terminal of the PMOSFET connected to the third port, a drain terminal of the PMOSFET connected to the fourth port, and a gate terminal of the PMOSFET connected to the second controller.

25. The system of claim 24, further comprising:
   an n-channel metal-oxide-semiconductor field-effect transistor (NMOSFET), a source terminal of the NMOSFET connected to a second ground, a drain terminal of the NMOSFET connected to the gate terminal of the PMOSFET, and a gate terminal of the NMOSFET connected to the second controller; and
   a second resistor connected between the source terminal of the PMOSFET and the gate terminal of the PMOSFET.

26. The system of claim 18, wherein the second controller is configured to transmit the data as binary digits, a first binary digit being represented by a transition, at a specific point in a cycle, from the first voltage level to the second voltage level, and a second binary digit being represented by a transition, at the specific point in the cycle, from the second voltage level to the first voltage level.

27. The system of claim 18, further comprising a third controller, the third controller connected to the second comparator.

28. The system of claim 27, wherein the third controller is the second controller.

29. The system of claim 18, wherein the current measurement circuitry comprises:
   a second resistor connected between the third port and the second switch; and
   a current-sense amplifier connected between the third port and the second switch.

30. The system of claim 18, wherein the second comparator is configured to produce a third voltage level in response to a current level measured by the current measurement circuitry being greater than a threshold current level and to produce a fourth voltage level in response to the current level measured by the current measurement circuitry being less than the threshold current level, and wherein the second sub-system is configured to receive the data as binary digits, a first binary digit being represented by a transition, at a specific point in a cycle, from the third voltage level to the fourth voltage level, and a second binary digit being represented by a transition, at the specific point in the cycle, from the fourth voltage level to the third voltage level.

* * * * *